(12) United States Patent
Engelen et al.

(10) Patent No.: US 9,167,672 B2
(45) Date of Patent: Oct. 20, 2015

(54) METHOD AND SYSTEM FOR AUTOMATICALLY VERIFYING THE POSSIBILITY OF RENDERING A LIGHTING ATMOSPHERE FROM AN ABSTRACT DESCRIPTION

(75) Inventors: Dirk Valentinus Rene Engelen, Heusden-Zolder (BE); Mark Henricus Verberkt, Eindhoven (NL); Leon C. A. Van Stuivenberg, Helmond (NL)

(73) Assignee: Koninklijke Philips N.V., Eindhoven (NL)

( * ) Notice: Subject to any disclaimer, the term of this patent is extended or adjusted under 35 U.S.C. 154(b) by 1243 days.

(21) Appl. No.: 12/519,441

(22) PCT Filed: Dec. 19, 2007

(86) PCT No.: PCT/IB2007/055218
§ 371 (c)(1),
(2), (4) Date: Jun. 16, 2009

(87) PCT Pub. No.: WO2008/078286
PCT Pub. Date: Jul. 3, 2008

(65) Prior Publication Data
US 2010/0049476 A1    Feb. 25, 2010

(30) Foreign Application Priority Data
Dec. 22, 2006    (EP) .................................. 06127084

(51) Int. Cl.
*G06F 17/50*    (2006.01)
*H05B 37/02*    (2006.01)
*H04N 1/60*    (2006.01)

(52) U.S. Cl.
CPC ............... *H05B 37/029* (2013.01); *H04N 1/60* (2013.01); *H05B 37/02* (2013.01)

(58) Field of Classification Search
CPC .................................................. G06F 17/5009
USPC ................. 703/6, 13; 709/220, 203; 715/234; 716/102; 717/104
See application file for complete search history.

(56) References Cited

U.S. PATENT DOCUMENTS 5,416,890 A    5/1995  Beretta
5,740,076 A    4/1998  Lindbloom
(Continued)

FOREIGN PATENT DOCUMENTS

JP    2000339354 A    12/2000
JP    2001166822 A    6/2001

OTHER PUBLICATIONS

Godfried Augenbroe, Pieter de Wilde, Hyeun Jun Moon, Ali Malkawi, An interoperability workbench for design analysis integration, Energy and Buildings, vol. 36, Issue 8, Aug. 2004, pp. 737-748.*
(Continued)

*Primary Examiner* — Saif Alhija
*Assistant Examiner* — Cuong Luu
(74) *Attorney, Agent, or Firm* — Meenakshy Chakravorty

(57) ABSTRACT

The invention relates to automatically verifying the possibility of rendering a lighting atmosphere from an abstract description, for example from a lighting atmosphere specified in XML (Extensible Markup Language) independent of a specific lighting infrastructure and of a room layout. A basic idea of the invention is to translate the possibilities of a lighting infrastructure into so called light element templates. A light element template contains an indication of the possibilities of the lighting infrastructure at a certain semantic location, for example in a shop or a home in which the lighting infrastructure is provided. For every type of light effect of a lighting infrastructure, a different light element template may be created. This allows to automatically verify the possibility of rendering a lighting atmosphere from an abstract description in a lighting infrastructure at an early stage of the lighting atmosphere design process.

7 Claims, 13 Drawing Sheets

(56) References Cited

U.S. PATENT DOCUMENTS

| | | | |
|---|---|---|---|
| 5,801,958 A * | 9/1998 | Dangelo et al. | 716/102 |
| 6,377,355 B1 | 4/2002 | Kumada | |
| 6,466,234 B1 | 10/2002 | Pyle et al. | |
| 6,912,429 B1 | 6/2005 | Bilger | |
| 7,130,895 B2 * | 10/2006 | Zintel et al. | 709/220 |
| 2002/0100015 A1 * | 7/2002 | Harel et al. | 717/104 |
| 2002/0180973 A1 | 12/2002 | MacKinnon et al. | |
| 2003/0040813 A1 | 2/2003 | Gonzales et al. | |
| 2005/0275626 A1 | 12/2005 | Mueller et al. | |

OTHER PUBLICATIONS

JP2000_339354.*
JP2001_166822.*

* cited by examiner

|   |
|---|
| FIG. 2A-I |
| FIG. 2A-II |
| FIG. 2A-III |

FIG. 2A

```
<!DOCTYPE atmosphere SYSTEM "atmo.dtd">
<atmosphere name="Summer picture 2" id="18">
    <scene>
<!-- Cash register -->
    <lightelement areaselector="\cash register area" fadeintime="0" fadeouttime="0">
        <lighteffecttype>
            <ambient intensity="200" colour="0.48,0.6" />
        </lighteffecttype>
    </lightelement>
    <lightelement areaselector="\cash register area" fadeintime="0" fadeouttime="0">
        <lighteffecttype>
            <accent intensity="2000" colour="0.3,0.3" />
        </lighteffecttype>
    </lightelement>
    <lightelement areaselector="\cash register" fadeintime="0" fadeouttime="0">
        <lighteffecttype>
            <accent intensity="2000" colour="0.3,0.3" />
        </lighteffecttype>
    </lightelement>
```

FIG. 2A-I

| FIG. 2A-I |
|---|
| FIG. 2A-II |
| FIG. 2A-III |

FIG. 2A

```
<!-- ladies fashion\designer 1 -->
<lightelement areaselector="\ladies fashion\designer 1\clothing rack"
  fadeintime="0" fadeouttime="0">
  <lighteffecttype>
    <accent intensity="2000" colour="0.3,0.3" />
  </lighteffecttype>
</lightelement>
<lightelement areaselector="\ladies fashion\designer 1\mannequin" fadeintime="0"
  fadeouttime="0">
  <lighteffecttype condition="noperson">
    <accent intensity="5000" colour="0.55,0.4" />
  </lighteffecttype>
  <lighteffecttype condition="personnear">
    <accent intensity="2000" colour="0.3,0.3" />
  </lighteffecttype>
</lightelement>
```

FIG. 2A-II

FIG. 2A-III

```
<lightelement areaselector="\ladies fashion\designer 1\wall" fadeintime="0"
   fadeouttime="0" >
  <lighteffecttype>
    <architectural>
      <picturewallwash pngfile="summer_2_left.png"
         intensity="2000"/>
    </architectural>
  </lighteffecttype>
</lightelement>
```

| FIG. 2B-I |
| FIG. 2B-II |

FIG. 2B

```
<lightelement areaselector="\ladies fashion\designer 2\clothing rack"
    fadeintime="0" fadeouttime="0">
    <lighteffecttype>
        <accent intensity="500" colour="0.3,0.3" />
    </lighteffecttype>
</lightelement>

<!-- ladies fashion\designer label 3 -->

<lightelement areaselector="\ladies fashion\designer 3\clothing rack"
    fadeintime="0" fadeouttime="0">
    <lighteffecttype>
        <accent intensity="2000" colour="0.3,0.3" />
    </lighteffecttype>
</lightelement>
```

FIG. 2B-I

| FIG. 2B-I |
| FIG. 2B-II |

FIG. 2B

```
<lightelement areaselector="\ladies fashion\designer 3\wall" fadeintime="0" fadeouttime="0">
  <lighteffecttype>
    <architectural>
      <wallwash intensity="1500" colour="0.2, 0.05"/>
    </architectural>
  </lighteffecttype>
</lightelement>

<lightelement areaselector="\ladies fashion\designer 3\mannequin" fadeintime="0" fadeouttime="0">
  <lighteffecttype condition="noperson">
    <accent intensity="5000" colour="0.55,0.4" />
  </lighteffecttype>
  <lighteffecttype condition="personnear">
    <accent intensity="2000" colour="0.3,0.3" />
  </lighteffecttype>
</lightelement>
```

FIG. 2B-II

```
<!--discount-->
<lightelement areaselector="\discount" fadeintime="0" fadeouttime="0">
  <lightdistribution coordinatesystem="3D" intensity="500">
    <shape type="square">
      <vertex x="-0.5" y=" 0.5" />
      <vertex x="-0.5" y="-0.5" />
      <vertex x=" 0.5" y="-0.5" />
      <vertex x=" 0.5" y=" 0.5" />
    </shape>
    <colourpoints>
      <colour colour="0.2,0.15" />
      <colour colour="0.3,0.2" />
      <colour colour="0.4,0.3" />
      <colour colour="0.5,0.4" />
    </colourpoints>
  </lightdistribution>
</lightelement>
```

FIG. 2C-I

| FIG. 2C-I |
|---|
| FIG. 2C-II |

FIG. 2C

```
<lightelement areaselector="\discount\ladies fashion\wall" fadeintime="0"
    fadeouttime="0">
    <lighteffecttype>
        <architectural>
            <picturewallwash pngfile="picturewallwashdiscount.png"
                intensity="3500"/>
        </architectural>
    </lighteffecttype>
</lightelement>

<lightelement areaselector="\discount\ladies fashion\mannequin" fadeintime="0"
    fadeouttime="0">
    <lighteffecttype condition="noperson">
        <accent intensity="3000" colour="0.5,0.3" />
    </lighteffecttype>
    <lighteffecttype condition="personnear">
        <accent intensity="3000" colour="0.3,0.3" />
    </lighteffecttype>
</lightelement>
</scene>
</atmosphere>
```

FIG. 2C-II

METHOD AND SYSTEM FOR AUTOMATICALLY VERIFYING THE POSSIBILITY OF RENDERING A LIGHTING ATMOSPHERE FROM AN ABSTRACT DESCRIPTION

The invention relates to automatically verifying the possibility of rendering a lighting atmosphere from an abstract description, for example from a lighting atmosphere specified in XML (Extensible Markup Language) independent of a specific lighting infrastructure and of a room layout.

Lighting systems in retail spaces and at home will become more flexible and dynamic with the advent of connectivity solutions for luminaries and color controllable lighting. Widespread deployment of these systems enables the creation of abstractly described lighting atmospheres. A lighting atmosphere may be for example described by an abstract description in XML (Extensible Markup Language). The term "abstract" means independent of a specific lighting infrastructure, i.e. the light units, and independent of a specific room or building layout. These abstract descriptions of lighting atmospheres can be installed in specific rooms or buildings, where they can (automatically) be adapted to the specific aspects of the space, for example, the layout of a certain shop, available wall switches, occupancy sensors, yielding a (unique) variant of the lighting atmospheres. This enables a wide range of new lighting possibilities. Shop chains for instance can start to use lighting as a marketing tool. For example, abstract light atmospheres enable one time creation of a corporate lighting atmosphere at e.g. the head quarters of a shop chain, and rendering of the corporate lighting atmosphere in all the shop instances. On the other hand, service providers can start to create abstract light atmospheres that can be purchased by end-users, and for example offered for downloading over the internet.

U.S. Pat. No. 6,466,234 B1 discloses a method and system for controlling environmental conditions, such as lighting. The lighting system provides an architecture that includes a scene description data structure. A scene defines one or more circuits and a target state for the lights on those circuits. The scene description data structure specifies circuits within a scene and specifies a target state for the lights on those circuits within a scene. The lighting system provides a lighting gateway that retrieves and provides scene descriptions to assist in generating a user interface for enabling scenes, and that receives requests to enable scenes and then requests a lighting controller to enable the target state for each circuit within the scene.

It is an object of the invention to provide an automatic verification of the possibility of rendering a lighting atmosphere from an abstract description, particularly in order to obtain an early feedback on rendering a lighting atmosphere in a certain lighting environment.

The object is solved by the independent claim(s). Further embodiments are shown by the dependent claim(s).

A basic idea of the invention is to translate the possibilities of a lighting infrastructure into so called light element templates. A light element template contains an indication of the possibilities of the lighting infrastructure at a certain semantic location, for example in a shop or a home in which the lighting infrastructure is provided. For every type of light effect of a lighting infrastructure, a different light element template may be created. This allows to automatically verify the possibility of rendering a lighting atmosphere from an abstract description in a lighting infrastructure at an early stage of the lighting atmosphere design process. Thus, a lighting designer may obtain an early feedback on whether a lighting atmosphere may be rendered in a certain lighting infrastructure or not. This is particularly useful when a lighting atmosphere is designed at a high level of abstraction, for example with a lighting atmosphere design program for a remote lighting infrastructure such as a chain of shops for which certain lighting atmospheres are designed at the shops chain headquarter, i.e. far away from the real location.

In the following, some important terms used herein are explained.

The term "lighting atmosphere" as used herein means a combination of different lighting parameters such as intensities of different spectral components of a lighting, the colors or spectral components contained in a lighting, the color gradient or the like.

The term "abstract description" of a lighting atmosphere means a description of the atmosphere at a higher level of abstraction than a description of settings of the intensity, color or like of every individual lighting device or unit of a lighting infrastructure. It means for example the description of the type of a lighting such as "diffuse ambient lighting", "focused accent lighting", or "wall washing" and the description of certain lighting parameters such as the intensity, color, or color gradient at certain semantic locations at certain semantic times, for example "blue with low intensity in the morning at the cash register" or "dark red with medium intensity at dinner time in the whole shopping area".

The term "semantic location" or "semantic time" means a description of a location or time such a "cash register" in a shop or "lunch time" in contrast to a concrete description of a location with coordinates.

It should be understood that the abstract description of a lighting atmosphere does not comprise concrete information about a specific instance of a lighting infrastructure such as the number and locations of the used lighting units or devices and their colors and available intensities.

The term "lighting infrastructure" means a concrete implementation of a lighting system in a specific room, for example a specific instance of a lighting system applied to a certain shop, hotel lobby, or restaurant. The term "lighting infrastructure" comprises a complex system for illumination, particularly containing several lighting units, for example a plurality of LEDs (light emitting diodes) or other lighting devices such as halogen bulbs. Typically, such a lighting infrastructure applies several tens to hundreds of these lighting devices so that the composition of a certain lighting atmosphere by individually controlling the characteristics of each single lighting device would require a computerized lighting control equipment.

According to an embodiment of the invention, a method for verifying the possibility of rendering a lighting atmosphere from an abstract description is provided, wherein the method comprises the following characteristic features:

electronically receiving light element templates of a lighting infrastructure, wherein a light element template contains an indication of the possibilities of the lighting infrastructure at a certain semantic location, automatically processing the received light element templates by comparing them with the light elements of the abstract description, and signaling whether rendering the lighting atmosphere from the abstract description is possible or not.

According to an embodiment of the invention, the method may further comprise the step of summarizing the possibilities of the lighting infrastructure for different areas in a lighting infrastructure information according to the type of light that the light units of the lighting infrastructure can generate, wherein each area comprises an area selector as an indication of a certain semantic location.

This allows to summarize the lighting possibilities for different areas for example in a shop and to provide a data base for generating light element templates. The summary of the lighting infrastructure possibilities can be for example created using Information on the available light units in a shop/home, and their capabilities.

The semantic location that the light units are in/generate their effect in.

Heuristics, like luminaries typically provide diffuse/ambient light. This type of heuristics can be built into the system by the system manufacturer.

According to a further embodiment of the invention, the method may comprise the further step of organizing and grouping the lighting infrastructure information by area selectors for generating a light element template, wherein an area selector is an indication of a certain semantic location and comprises one or more area types.

The organization and grouping of the information by area selectors allow to quickly determine whether an abstract light element is available in certain lighting infrastructure.

According to an embodiment of the invention, the method may make this possible in that the step of automatically processing the received light element templates by comparing them with the light elements of the abstract description comprises determining the area selector of a certain light element of the abstract description, locating a light element template with the same area selector than the certain light element, and if a light element template can be located checking further parameters of the certain light element by comparing them with the located light element template.

Thus, the area selector of the light element templates is suitable measure to quickly match a light element of the abstract description with a received light element template.

According to a further embodiment of the invention, the method may comprise the further step of automatically making information on available light units of the lighting infrastructure and their capabilities available in a network environment by means of a service and device discovery mechanism.

This is very helpful when automatically collecting information about the light units of a lighting infrastructure and creating the lighting infrastructure information containing the possibilities of the lighting infrastructure for different areas according to an embodiment of the invention as described above. Thus, the tedious work of creating the lighting infrastructure information may be made much easier and more comfortable. For example, a lighting infrastructure may be triggered by a client such as a lighting atmosphere verification workstation to automatically make the information on available light units available by sending an instruction to the lighting infrastructure, particularly a lighting controller of the lighting infrastructure. Then, the lighting infrastructure may respond immediately or first collect the information from the individual light units and transmit the information to the requesting client.

According to a yet further embodiment of the invention, the method may comprise the further step of making available the semantic location that a light unit is in or generates its lighting effect in by an automatic installation or calibration procedure.

For example, with a dark room calibration procedure of the lighting infrastructure, the semantic location of each light unit of the infrastructure may be automatically determined and then made available for example together with specific parameters of a lighting unit.

According to an embodiment of the invention, the method may further comprise the steps of selecting a lighting atmosphere by a client communicating with a server, transmitting light element templates of a lighting infrastructure from the client to the server, automatically processing the received light element templates by comparing them with the light elements of the abstract description of the selected light atmosphere on the server, transmitting the processing result from the server to the client, and signaling whether rendering the selected lighting atmosphere from the abstract description is possible or not depending on the received processing result on the client.

This embodiment is useful for home lighting and obtaining lighting atmospheres over a communication network such as the internet. The client may be a personal computer at home, for example accessing a website offering lighting atmospheres for buying. A user may select a desired lighting atmosphere on the website. Next, the personal computer of the user may transmit the light element templates of the home lighting infrastructure to the server, for example after the user has clicked on a certain button of the website. The templates may either entered manually in the personal computer or automatically by communicating with the light units of the home lighting infrastructure assuming the light units and the personal computer are connected via a home network, for example a LAN (Local Area Network) or WLAN (wireless LAN) or PAN (Personal Area Network). The client may also retrieve the light element templates which may be stored in a lighting controller of the lighting infrastructure or in each light unit. On the server, the received light element templates may then be automatically processed by comparing them with the light elements of the abstract description of the selected lighting atmosphere. Afterwards, the processing result may be transmitted from the server to the client. Finally, the result of the processing, i.e. whether rendering the selected lighting atmosphere from the abstract description is possible or not, may be displayed on the monitor of the personal computer of the client. Thus, a user may quickly and reliably determine whether a desired lighting atmosphere offered for buying may be rendered with her/his own home lighting infrastructure.

According to a further embodiment of the invention, the method may comprise the further step of electronically receiving light element templates of several lighting infrastructures, and combining the received light element templates for further processing.

This allows for example to combine the light element templates of different shops of a shop chain. This allows to give a lighting atmosphere designer, who creates a lighting atmosphere such as a corporate lighting design for all shops of the shop chain, a feedback on how well the designed lighting atmosphere can be rendered in the shops. For example, the designer gets a quick feedback whether a certain lighting effect of a designed lighting atmosphere may be rendered in all shops, i.e. in all lighting infrastructures of the shop chain.

According to a further embodiment of the invention, the light element templates may be electronically received over a network connection with a lighting controller of a lighting infrastructure.

According to a further embodiment of the invention, a computer program is provided, wherein the computer program may be enabled to carry out the method according to the invention when executed by a computer.

According to an embodiment of the invention, a record carrier such as a CD-ROM, DVD, memory card, floppy disk or similar storage medium may be provided for storing a computer program according to the invention.

A further embodiment of the invention provides a computer which may be programmed to perform a method according to the invention. The computer may comprise an interface for communication with a lighting infrastructure. The communication may be for example performed over wire line or wireless communication connections between the interface and the lighting infrastructure. In case of wireless communication connections, the interface may comprise a radio frequency (RF) communication module such as a WLAN and/or Bluetooth® and/or ZigBee module which may establish a communication connection with respective counterparts of the lighting infrastructure.

According to a further embodiment of the invention, a system for verifying the possibility of rendering a lighting atmosphere from an abstract description is provided, wherein the system comprises the following characteristic features:

receiving means for electronically receiving light element templates of a lighting infrastructure, wherein a light element template contains an indication of the possibilities of the lighting infrastructure at a certain semantic location, processing means for automatically processing the received light element templates by comparing them with the light elements of the abstract description, and signaling means for signaling whether rendering the lighting atmosphere from the abstract description is possible or not.

According to an embodiment of the invention the system may comprise a lighting atmosphere design module adapted to generate the abstract description of the lighting atmosphere, and a verification module comprising the receiving, processing and signaling means.

According to an embodiment of the invention, the verification module may be implemented as a computer program executed by a computer.

According to a further embodiment of the invention, the computer may comprise a communication module comprising the receiving means.

According to a further embodiment of the invention, the system may comprise a built in heuristic of luminaries of the light units of the lighting infrastructure, wherein the heuristic can be processed for generating light element templates.

According to a further embodiment of the invention, a data structure of a light element template for usage with a method of the invention or a system of the invention is provided, wherein the data structure comprises an area selector identifier field, and one or more light type identifier fields containing the light types available in the area determined by the content of the area selector identifier field.

According to an embodiment of the invention, the data structure may comprise further light type identifier fields containing maximum and/or minimum light intensity values and color values.

According to a further embodiment of the invention, a record carrier storing a data structure according to the invention is provided, for example a CD-ROM, a DVD, a memory card, a diskette, or a similar data carrier suitable to store the data structure for electronic access.

According to a further embodiment of the invention, a modulated data signal carrying the data structure according to the invention may be provided, for example an data transmission signal carrying the data structure in a computer network such as the internet.

These and other aspects of the invention will be apparent from and elucidated with reference to the embodiment(s) described hereinafter.

The invention will be described in more detail hereinafter with reference to exemplary embodiments. However, the invention is not limited to these exemplary embodiments.

Figure 5:
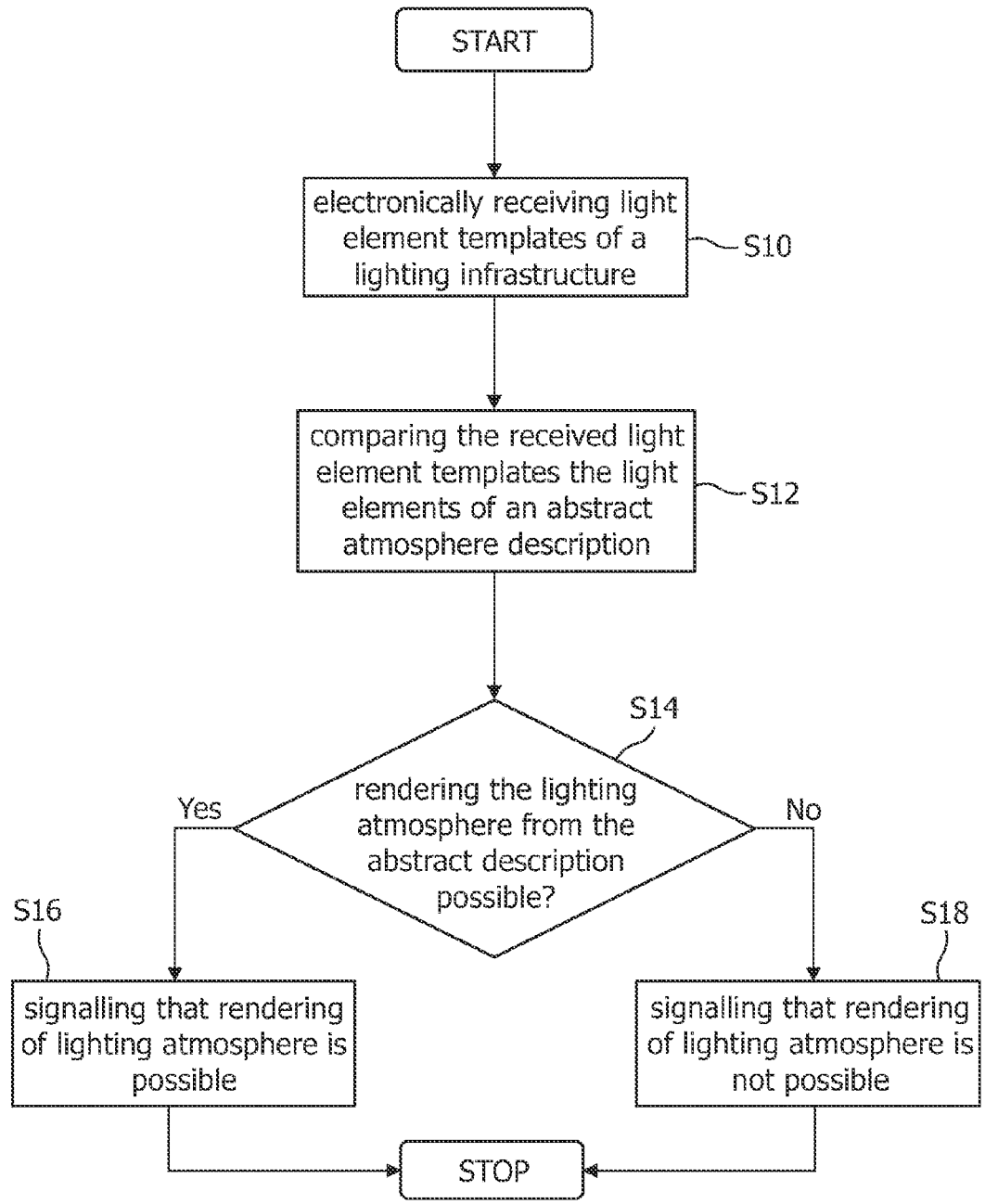
Figure 6:
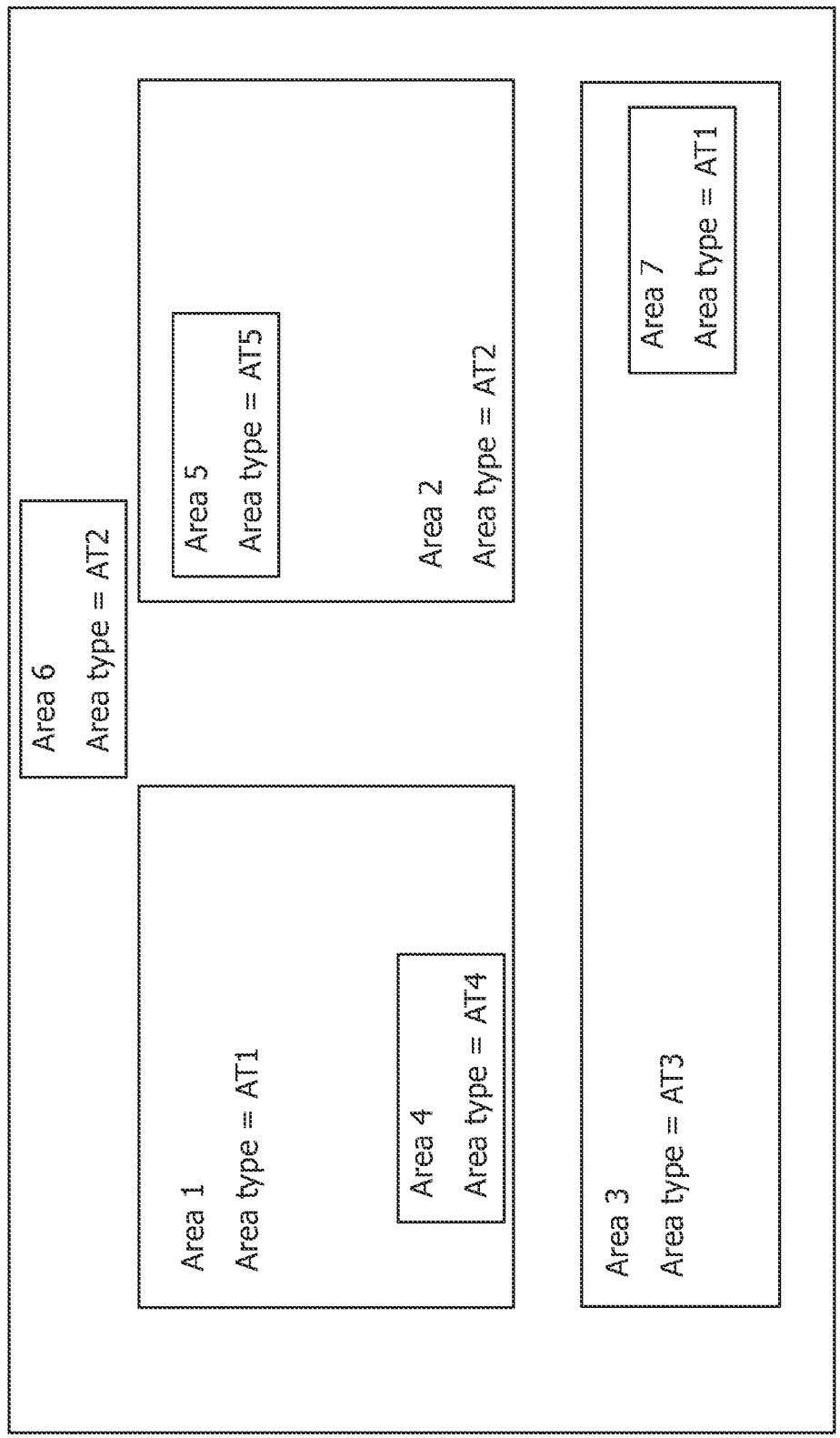
Figure 7:
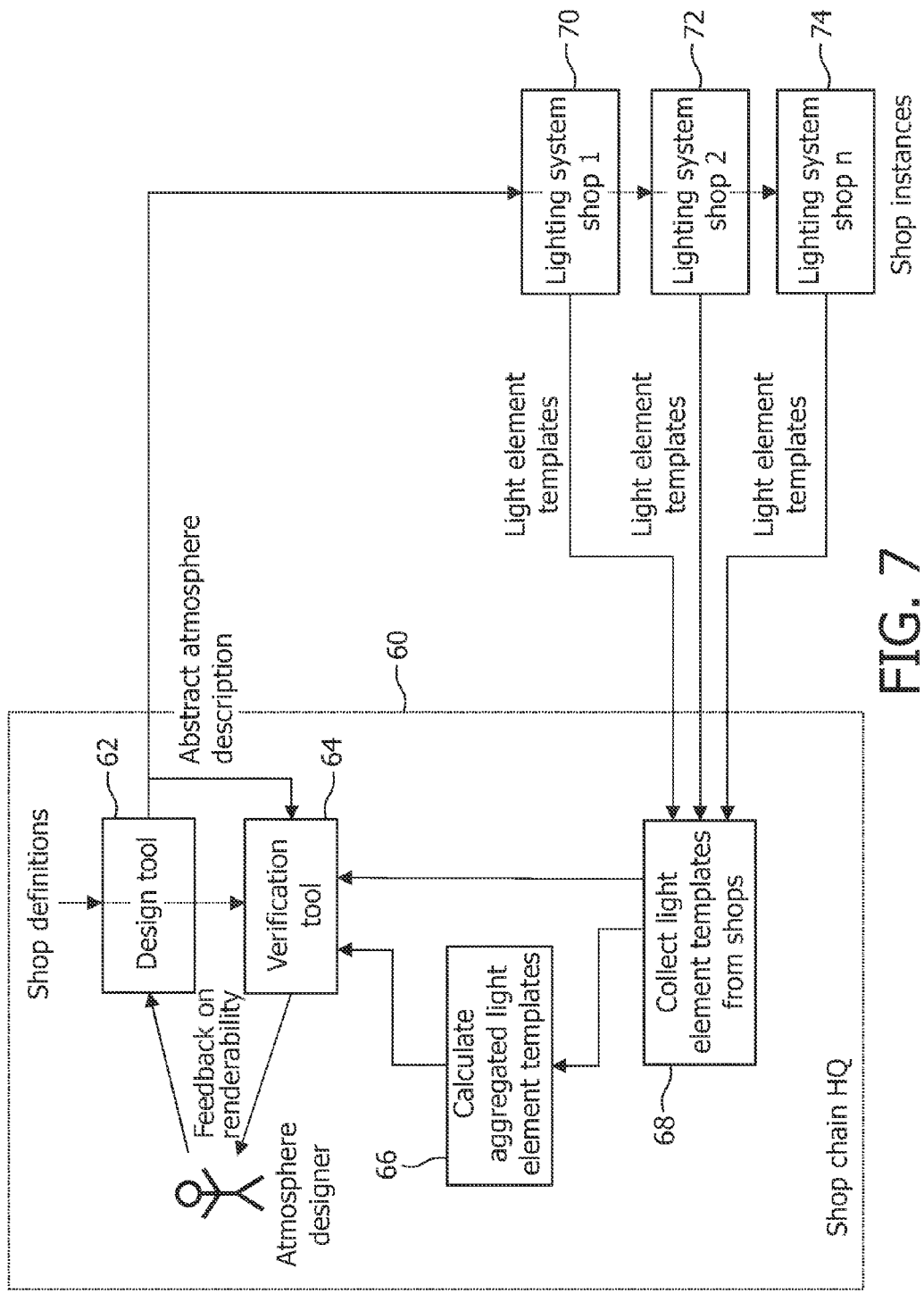
Figure 8:
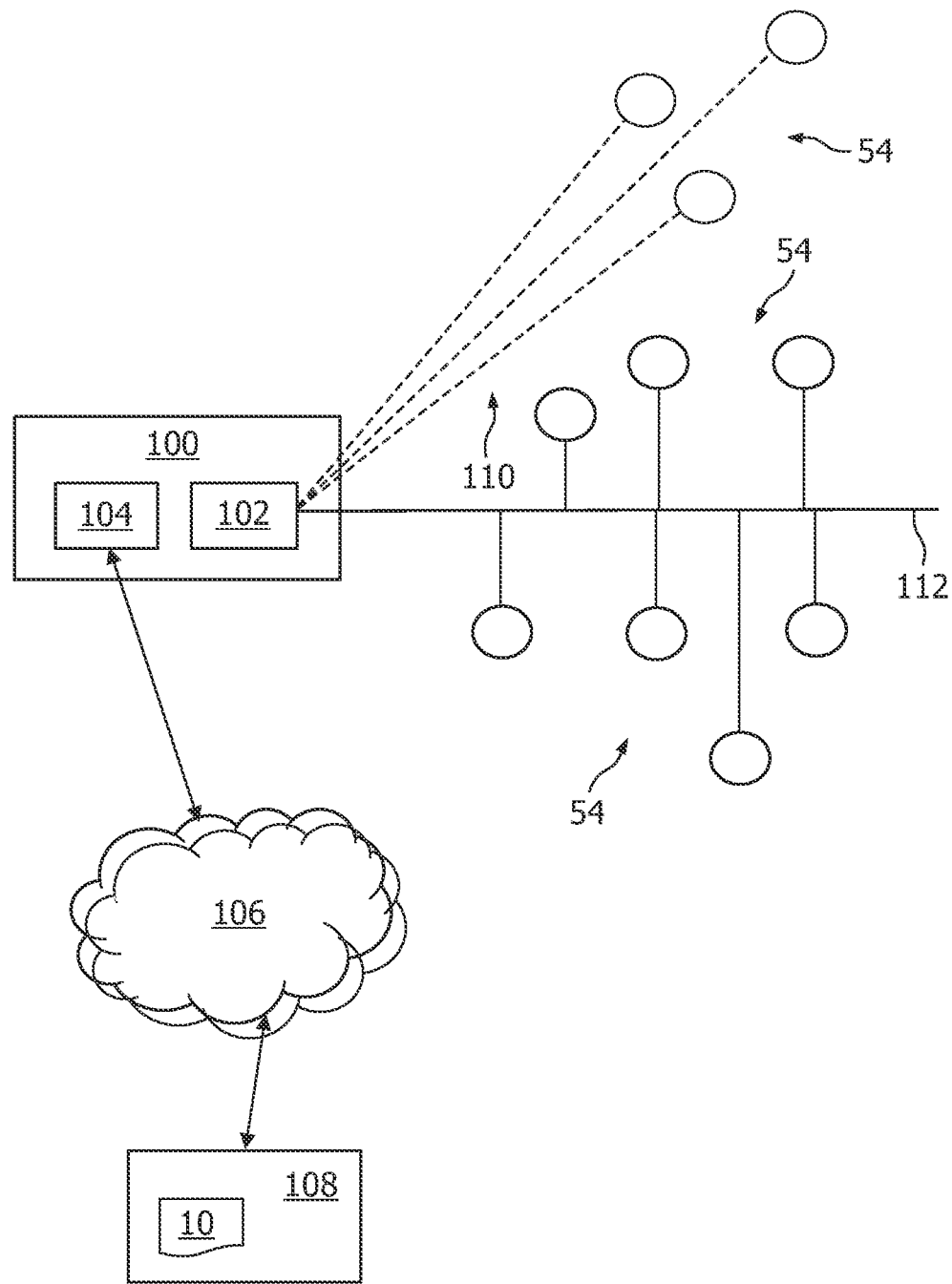

FIG. 5 a flowchart of an embodiment of the method for automatically verifying the possibility of rendering a lighting atmosphere from an abstract description according to the invention;

FIG. 6 shows the layout of a shop instance with different semantic areas which are classified using area types according to the invention;

FIG. 7 shows an embodiment of a system for automatically verifying the possibility of rendering a lighting atmosphere from an abstract description according to the invention; and FIG. 8 shows an embodiment of a system for creating a lighting atmosphere from an abstract atmosphere description according to the invention, wherein the abstract description is stored on a server computer in the internet for downloading.

In the following description, the terms "lighting device", "lighting unit", "light unit", and "lamp" are used as synonyms. These terms mean herein any kind of electrically controllable lighting device such as a semiconductor-based illumination unit such as a LED, a halogen bulb, a fluorescent lamp, a light bulb. Furthermore, (functional) similar or identical elements in the drawings may be denoted with the same reference numerals.

Figure 1:
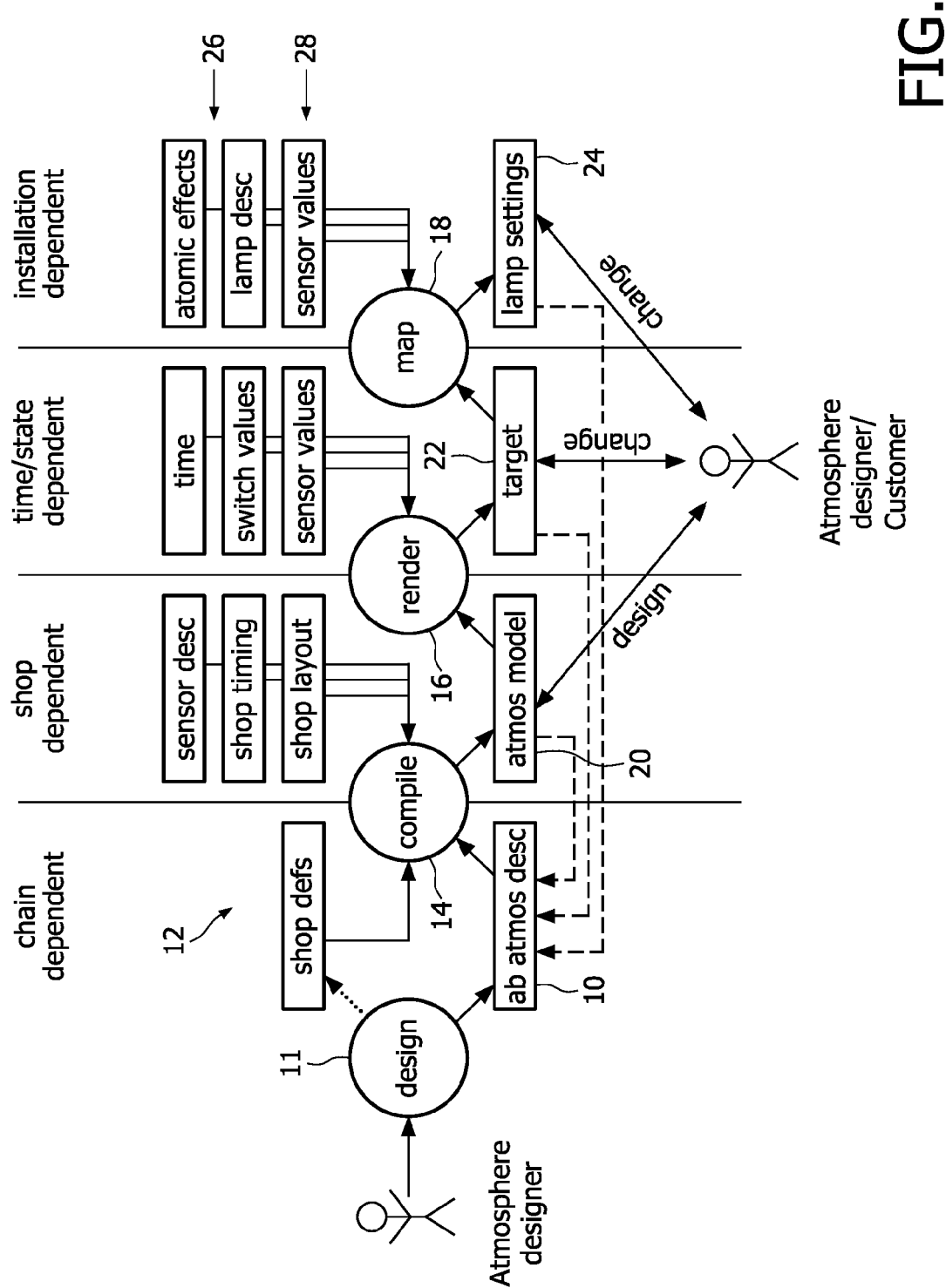
FIG. 1 shows a flow diagram of an embodiment of a method for composing a lighting atmosphere in a shop from an abstract description of the lighting atmosphere according to the invention.

An overview of the flow according to the method for composing a lighting atmosphere from an abstract description for a shop is depicted in FIG. 1. Via some design process 11, for example by using a lighting atmosphere composition computer program with a graphical user interface (GUI), an abstract atmosphere description 10 is created (in FIG. 1 also denoted as ab atmos desc). The abstract atmosphere description can also be generated from one of the interaction methods depicted at the bottom of FIG. 1. The abstract description 10 merely contains descriptions of lighting effects at certain semantic locations at certain semantic times/occasions. The lighting effects are described by the type of light with certain parameters. The abstract description 10 is shop layout and lighting system independent. Thus, it may be created by a lighting designer without knowledge about a specific lighting system and lighting environment such as a room layout. The designer must know only semantic locations of the lighting environment, for example "cash register" or "shoe box 1", "shoe box 2", "changing cubicle", "coat stand" in a shoe or fashion shop. When using a GUI for creating the abstract description 10, it may be for example possible to load a shop layout template containing the semantic locations. Then the designer can create the lighting effects and the atmosphere by for example drag and drop technology from a palette of available lighting devices. The output of the computer program with the GUI may be a XML file containing the abstract description 10.

Figure 2:
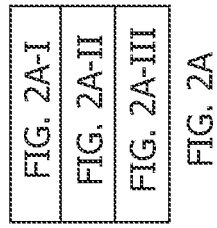
FIG. 2A to 2C show a XML file as an embodiment of an abstract atmosphere description according to the invention, wherein the file contains an abstract description of a lighting atmosphere in a shop.

An example of an XML file containing such an abstract atmosphere description is shown in FIG. 2A to 2C. In the abstract atmosphere description, elements of the light atmosphere description are linked to semantic (functional) locations in the shop. As can be seen in FIG. 2A to 2C, the semantic locations are introduced by the attribute "areaselector". The lighting atmosphere at this semantic location is introduced by the tag name "lighteffecttype". The type of light with lighting parameters is described by the tag names "ambient", "accent", "architectural" and "wallwash", as picture by using the tag names "architectural" and "picturewallwash", or as a lightdistribution. The parameters are described by the attributes "intensity", for example of 2000 (lux/nit), and "color", for example x=0.3, y=0.3. In case of a picture wall washing effect the shown picture is specified by the attribute "pngfile" and its intensity. In case of a light distribution, the intensity is specified, the color at the corners of the area and possibly parameters specifying the s-curve of the gradient. Furthermore, for some lights fading in and out may be specified by the attributes "fadeintime" and "fadeouttime".

Such an abstract description may be automatically translated into control values for the different lighting devices or units, i.e., lamps of a specific instance of a lighting system (in FIG. 1 denominated as lamp settings 24) in three stages:

1. Compiling 14 the abstract description 10 into an atmosphere model 20: In the compile stage 14, the abstract (shop layout and light infrastructure independent) atmosphere description 10 is translated into a shop layout dependent atmosphere description. This implies that the semantic locations 12 are replaced by real locations in the shop (physical locations). This requires at minimum some model of the shop with an indication of the physical locations and for each physical location which semantic meaning it has (e.g. one shop can have more than one cash register. These all have different names, but the same semantics). This information is available in the shop layout. Beside the semantic locations, also semantic notions of time (e.g. opening hours) are replaced by the actual values (e.g. 9:00-18:00). This information is available in the shop timing. Furthermore, for light effects that depend on sensor readings, an abstract sensor is replaced by the (identifier of the) real sensor in the shop. These shop dependent values are contained in a shop definitions file 12 containing specific parameters of the shop and the applied lighting system. The shop definitions contain the vocabulary that can be used in the abstract atmosphere, shop layout and shop timing. The output of the compiler stage is the so called atmosphere model 20 (atmos model), which still contains dynamics, time dependencies and sensor dependencies.

2. Rendering 16 the atmosphere model 20 to a target 22: In the rendering stage, all dynamics, time dependencies and sensor dependencies are removed from the atmosphere model 20. As such, the render stage creates a snapshot of the light atmosphere at a certain point in time and given sensor readings at that point in time. The output of the render stage is called the target 22. The target 22 can consist of one or more view points and per view point a color distribution, an intensity distribution, a CRI (Color Rendering Index) distribution, . . . .

3. Mapping 18 the target 22 into actual control values 24 for lighting devices, i.e. the lamp: The mapping stage converts the target 22 into actual lamp control values 24 (lamp settings). In order to calculate these control values 24, the mapping loop requires:

a. Descriptions of the lamps 26 available in the lighting system, like the type of lamp, color space, . . . .

b. The so-called atomic effects 26 which describe which lamp contributes in what way to the lighting of a certain physical location. How these atomic effects are generated is described below.

c. In case of controlling the lights with a closed feedback loop, the sensor values 28 to measure the generated light.

Based on these inputs 26 and 28 and the target 22, the mapping loop 18 uses an algorithm to control the light units or lamps, respectively, in such a way that the generated light differs as little as possible from the target 22. Various control algorithms can be used, like classical optimization, neural networks, genetic algorithms etc.

As already indicated, the mapping process 18 receives a target light "scene" from the rendering process 16. In order to calculate the lamp settings 24 required to generate light that approximates the target 22 as close as possible, the mapping process 18 needs to know which lamps contribute in what way to the lighting of a certain physical location. This is done by introducing sensors, which can measure the effects of a lighting device or lamp, respectively, in the environment. Typical sensors are photodiodes adapted for measuring the lighting intensity, but also cameras (still picture, video) may be considered as specific examples of such sensors.

As indicated above, abstract descriptions of lighting atmospheres will become possible in the future, both in professional (e.g. shop) as well as in the consumer domain. In both domains, it would be desirable to know beforehand how well such an abstract description of a light atmosphere can be rendered in a specific shop or home lighting infrastructure.

For instance, if a light designer at the head quarters of a shop chain wants to make a new light atmosphere for the shop chain, it is important that this light designer gets feedback on how well the atmosphere can be rendered in the shops of the shop chain.

This can be done by communicating the information of the lighting infrastructure (available light units, their characteristics and location) for all shops in the chain to the light designer. However, this method has large disadvantages. The amount of light sources can be very large, up to thousands of light sources per shop. This implies that simply communicating what kind of light units are available does not scale and will 'overwhelm' the light designer. Furthermore, the location of light units in the shop is not relevant to the light designer, but merely what the semantic location (e.g. entrance) of the light effect is. This requires transferring a detailed shop layout of every shop in the chain towards the light designer at the shop's head quarter (HQ), which again does not scale.

In the consumer domain, end-users that purchase an abstract light atmosphere of course want to be sure that such a light atmosphere can be rendered in their home, with its specific layout and lighting infrastructure. However, such an end-user is usually not an expert in lighting design and lighting systems. Consequently, it needs to be possible to verify in advance whether such a light atmosphere can be rendered. Impossibilities and limitations in the rendering need to be communicated to the consumer in an understandable way.

This invention provides a mechanism that enables verification of how well a light atmosphere can be rendered in a specific shop chain or home in a scalable and meaningful way as will be explained in the following in detail.

Instead of communicating the available light units to the e.g. lighting designer, the possibilities of the lighting infrastructure in the shop or home are translated into so called light element templates. A light element template is an indication of the possibilities of the lighting infrastructure at a certain (semantic) location in the shop or home. For every type of light effect, a different light element template will be created.

FIG. 6 depicts the layout of a shop instance with several lighting areas 1 to 7. The different areas area 1 to area 7 are classified using area types AT1 to AT5. Examples of area types are "entrance", "discount", "groceries" etc.

Figure 3:
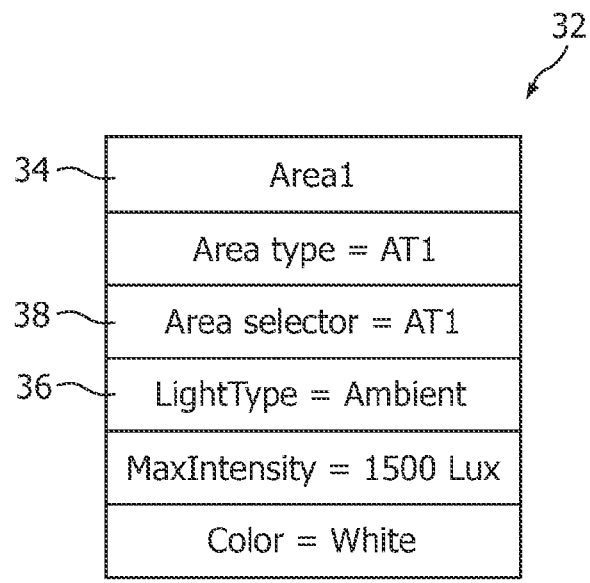
FIG. 3 shows a data structure of lighting infrastructure information for a certain area in a shop instance according to the invention.

The lighting possibilities for the different areas 1 to 7 in e.g. a shop can be 'summarized' according to the type of light that the light units can generate. A typical data structure 32 of such a summary is shown in FIG. 3 for an area called "Area1". The data structure 32 contains the area identifier field containing "Area1", an area type identifier field containing "AT1", an area selector field 38 containing "AT1", a light type field 36 containing the light type ambient available in this area, a maximum intensity field containing the highest light intensity of 1500 lux in this area, and a light color field containing the color white for white light.

The lighting possibilities of the different areas of the shop layout depicted in FIG. 6 listed as data structures 32 as shown in FIG. 3 may be for example:

---

Area1

Area type = AT1
Area selector = AT1
LightType = Ambient
MaxIntensity = 1500 Lux
Color = White Area2

Area type = AT2
Area selector = AT2
LightType = Ambient
MaxIntensity = 2000 Lux
Color = White
LightType = Task
MaxIntensity = 6000 Lux
Color = RGB Area3

Area type = AT3
Area selector = AT3
LightType = Ambient
MaxIntensity = 2000 Lux
Color = White Area4

Area type = AT4
Area selector = AT4 || AT1/AT4
LightType = Accent
MaxIntensity = 6000 Lux
Color = White Area5

Area type = AT5
Area selector = AT5 || AT2/AT5
LightType = Accent
MaxIntensity = 4000 Lux
Color = White Area6

Area type = AT2
Area selector = AT2
LightType = Ambient
MaxIntensity = 1000 Lux
Color = White
LightType = Architectural/wallwash
MaxIntensity = 500 nit
Color = RGB

---

-continued

Area7

Area type = AT1
Area selector = AT1 || AT3/AT1
LightType = Ambient
MaxIntensity = 1500 Lux
Color = White
LightType = Architectural/wallwash
MaxIntensity = 1000 nit
Color = RGB

---

In the above listed data structures for the different areas in the shop instance, the area selector is an indication of the semantic area in the shop or home. It may consist of one or more area types. For example, the area selector AT2/AT5 refers to all areas with type AT 5, which are a subarea of the areas with type AT2

The above 'summary' can be created using:

Information on the available light units in the shop or home, and their capabilities. In future networked lighting systems, this information will be made available automatically by means of a service and device discovery mechanism.

The semantic location that the light units are in/generate their effect in. This information is available from either a manual but preferably an automatic installation or calibration procedure.

Heuristics, like TL luminaries typically provide diffuse or ambient light. For example, if they are mounted at a height of 3 m a 14 W TL generates a light intensity of x lux, . . . . This type of heuristics can be built into the system by the system manufacturer (e.g. Philips Lighting).

Figure 4:
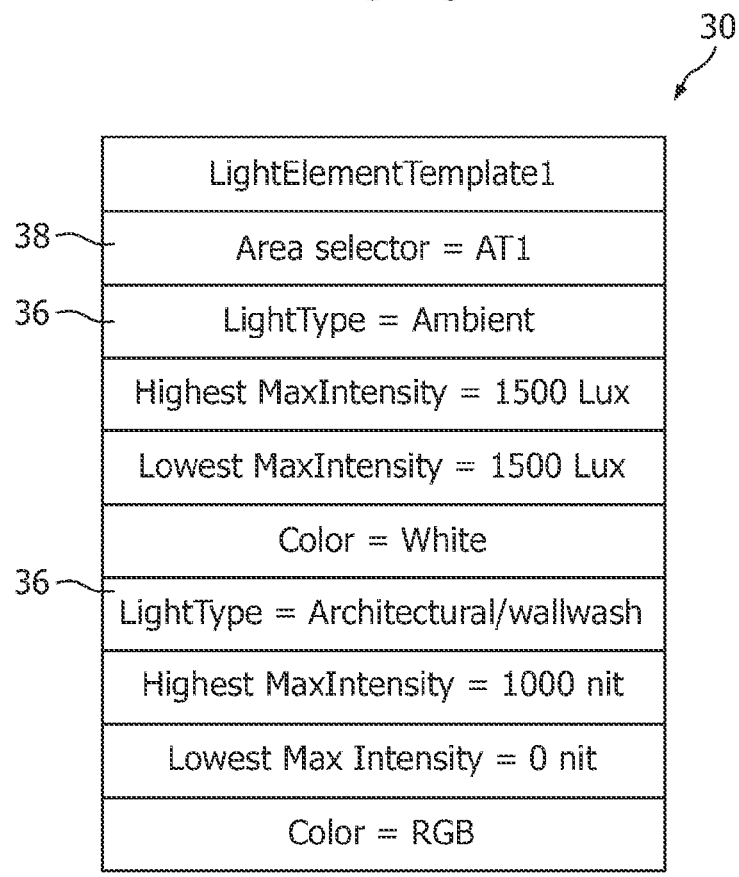
FIG. 4 shows a data structure of a light element template generated by organizing and grouping the light infrastructure information as shown in FIG. 3 according to the invention.

By organizing and grouping this summarized lighting infrastructure information by the area selector, a data structure for a light element template according to the invention may be generated. FIG. 4 shows such a data structure 30 for a "LightElementTemplate1". The data structure 30 contains several fields: an area selector field 38 "AT1", a light type field 36 containing the light type "Ambient" available as first light type in the area selector "AT1" area, two fields for the highest and lowest maximum intensity containing both 1500 lux for the first type of light, a color identifier field containing "white" for the first type of light, a further light type field 36 containing "Architectural/wallwash" for the second light type available in this area selector "AT1" area, two fields for the highest and lowest maximum intensity containing 1000 nit and 0 nit for the second type of light, a color identifier field containing "RGB" for the second type of light. All light element templates for the shop instance of FIG. 6 are as follows:

LightElementTemplate1
Area selector=AT1
LightType=Ambient
Highest MaxIntensity=1500 Lux
Lowest MaxIntensity=1500 Lux
Color=White
LightType=Architectural/wallwash
Highest MaxIntensity=1000 nit
Lowest Max Intensity=0 nit
Color=RGB
LightElementTemplate2
Area selector=AT2
LightType=Ambient
Highest MaxIntensity=2000 Lux
Lowest MaxIntensity=1000 Lux
Color=White
LightType=Task Highest MaxIntensity=6000 Lux
Lowest MaxIntensity=0 Lux
Color=RGB
LightType=Architectural/wallwash
Highest MaxIntensity=500 nit
Lowest MaxIntensity=0 nit
Color=RGB
LightElementTemplate3
Area selector=AT3
LightType=Ambient
Highest MaxIntensity=2000 Lux
Lowest MaxIntensity=2000 Lux
Color=White
LightElementTemplate4
Area selector=AT1/AT4
LightType=Accent
Highest MaxIntensity=6000 Lux
Lowest MaxIntensity=6000 Lux
Color=White
LightElementTemplate5
Area selector=AT2/AT5
LightType=Accent
Highest MaxIntensity=4000 Lux
Lowest MaxIntensity=4000 Lux
Color=White
LightElementTemplate6
Area selector=AT3/AT1
LightType=Ambient
Highest MaxIntensity=1500 Lux
Lowest MaxIntensity=1500 Lux
Color=White
LightType=Architectural/wallwash
Highest MaxIntensity=1000 nit
Lowest MaxIntensity=1000 nit
Color=RGB The LightElementTemplates for the area selectors AT4 and AT5 are removed, as these do not occur 'individually' in the shop, but only in the combination AT1/AT4 and AT2/AT5.

As explained with reference to FIG. 2A to 2C, the abstract light atmosphere, made by a light designer, is specified in abstract light elements. For example:
LightElement1
Areaselector=AT1
LightType=Ambient
Intensity=1200 Lux
Color=white.
LightElement2
AreaSelector=AT5
LightType=Architectural/wallwash
Intensity=1000 nit
Color=yellow
LightType=accent
Intensity=3000 Lux
Color=white By comparing the light elements of the atmosphere description with the light element templates, it can be verified quickly and automatically whether it is possible to render the light elements in the specific shop or home. In the example, it is immediately clear that wall washing in areas with an area selector that ends with AT5 is not possible. If rendering is not possible, feedback can be provided for example at a semantic level, like displaying a message like "it is not possible to create a wall wash effect in the area with area type 5" in the light designer's computer monitor.

FIG. 5 outlines in a flowchart essential steps of the verification process. First, in a step S10, light element templates of a lighting infrastructure, for example the above listed light element templates, are electronically received by a computer system configured to perform the verification process. Then, in step S12, the received light element templates are compared with the light elements of an abstract description of a lighting atmosphere. In a next step S14, it is checked whether rendering the lighting atmosphere in the lighting infrastructure of the shop instance and as represented by the received light element templates is possible or not. If the rendering is possible, this is signaled for example to a user or to a system for automatically configuring the lighting infrastructure in order to create the desired lighting atmosphere in a step S16. Otherwise, it is signaled that the rendering is not possible in a step S18.

Similarly, the LightElementTemplates of different shops in a shop chain can be combined (see FIG. 7). This can give a light designer, who creates a light atmosphere for all shops in the shop chain, feedback on how well the light atmosphere can be rendered in the shop chain. If for instance the specified intensity of a light element for a certain area selector is below the lowest maximum intensity value of the LightElementTemplate for that area selector, this implies that this light element can be rendered in all shops. On the other hand, if the specified intensity is higher than the highest maximum intensity of the LightElementTemplate, this LightElement cannot be rendered in any of the shops in the chain.

FIG. 7 depicts a system 60 for automatically verifying the possibility of rendering a lighting atmosphere from an abstract description, which offers two possibilities to verify the light atmosphere on how well it can be rendered:

Against the aggregated LightElementTemplates for all shops, which gives an indication of how well the atmosphere can be rendered in all shops of the chain Against the LightElementTemplates of the individual shops, providing feedback on shop instance level.

At the shop chain HQ, an atmosphere designer creates lighting atmospheres for the shops of the chain using a design tool 62. The design tool 62 receives the shop definitions as additional input to the designer's inputs for designing the lighting atmosphere. The verification system 60 comprises a verification tool 64, a calculation module 66 for calculating the aggregated light element templates from the lighting systems 70, 72 and 74 of the different shops of the chain, and a collection module 68 for collecting the light element templates from the lighting systems 70, 72 and 74 of the different shops of the chain. When the designer has finished designing a certain lighting atmosphere and created the abstract description of the lighting atmosphere which may be automatically created by the design tool 62, she/he may initiate the verification process according to the invention by clicking for example on a verification button of the design tool 62. The design tool 62 then triggers the verification tool 64 which receives the abstract description from the design tool 62 and either the collected light templates from the collection module 68 for performing verification on shop instance level or the aggregated light element templates from the calculation module 66 for performing verification for all shops and indication of how well the atmosphere may be rendered in all shops. The result of the verification is displayed on a monitor of the designer's computer so that the designer may next decide whether the abstract atmosphere description is transmitted to the lighting systems 70, 72 and 74 of the different shops of the chain.

As already indicated, this invention can also be used by consumers that intend to buy light atmospheres for e.g. their home. In that case, the light atmosphere is verified against the LightElementTemplates of the home in question. If the light atmosphere is not realizable for certain area selectors, feedback to the user should be provided in a clear and concrete way. This implies that for rendering issues, the most specific area selector where the rendering issue occurs should be provided to the user. In the earlier example, where the LightElement for AT5 was conflicting with the LightElementTemplates of area selectors AT5 and AT2/AT5, the indication to the user should be that wall washing is not possible in area AT2/AT5. Actually, for lighting designers, the problem is indicated in the light design, for example by the verification module 64 executed by the light designer's computer as shown in FIG. 7, while for end-consumers potential issues are indicated in terms of LightElementTemplates, being a representation of the lighting infrastructure in the home.

FIG. 8 shows a system for creating a lighting atmosphere from an abstract atmosphere description in a user's home lighting infrastructure. The system comprises a user's PC 100. The PC 100 comprises an interface 102 for communication with a lighting system containing several lighting units 54. The interface 102 is adapted to communicate with the lighting units 54 via a communication bus 112 and RF communication connections 110. The PC 100 transmits control values or settings over the communication connections 110 and 112 to the lighting units 54 in order to adjust them, particularly their lighting intensities and colors. Finally the PC 100 contains receiving means 104 such as a network adapter for receiving an abstract atmosphere description 10 from a server computer 108 over the internet 106. The server computer 108 also hosts a website for abstract lighting atmospheres. Thus, a user can access this website through her/his PC 100 and select a desired abstract lighting atmosphere. By clicking on a certain button on the website, the PC 100 may upload light element templates of the user's home lighting system which are stored on the user's PC 100. The server computer 108 then verifies with the received light element templates whether rendering the desired lighting atmosphere in the user's lighting system is possible or not, for example as shown in FIG. 6. When the verification process is finished, the result may be displayed by the website so that the user sees whether the desired lighting atmosphere may be rendered in her/his lighting system. Thereafter, the user may download the desired abstract description of the desired lighting atmosphere from the server computer 108 onto her/his PC 100, for example after paying the supplier of the abstract lighting atmospheres. The PC 100 may start to process the downloaded abstract atmosphere description 10. The downloaded abstract atmosphere description 10 is processed in the PC 100 in order to obtain a set of control values that may be communicated to the lighting units 54 over the connections 110 and 112 in order to implement the lighting atmosphere in the user's home lighting system.

The invention can be applied all situations where abstract light atmospheres are being made for a multitude of lighting infrastructures and/or room layouts.

In the situation that a light atmosphere cannot be realized by a certain lighting infrastructure, advice can also be given on what type of light units to add in which semantic area(s) in the shop/home, for example by displaying a respective user's help on a computer monitor.

The invention can be used in (relatively large) lighting systems that are used for effect as well as functional lighting. An important feature of the invention is, that light scenes or atmospheres only have to be described once e.g. for a complete shop chain. Automatic verification of an abstract lighting atmosphere on the local situation enables to check at an early stage of a lighting design process whether rendering the lighting atmosphere is possible or not. Because of the room and lighting infrastructure independence of the light description, it can also be used in service models. For instance, a service provider can offer light scenes without requiring precise knowledge on the layout or lighting system on which the light scene has to be rendered.

At least some of the functionality of the invention such as the process of verification may be performed by hard- or software. In case of an implementation in software, a single or multiple standard microprocessors or microcontrollers configuration may be used. The invention might be implemented by single or multiple algorithms.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A method for automatically verifying the possibility of rendering a lighting atmosphere from an abstract description, comprising:

creating a plurality of light element templates for a lighting infrastructure;

electronically receiving the light element templates of the lighting infrastructure, the lighting infrastructure including a plurality of light units in a lighting system implementation, wherein a light element template contains an indication of possible light effects of the lighting infrastructure at a certain semantic location, automatically processing the received light element templates by comparing them with light elements of the abstract description, signaling, based on the automatic processing of the received light element templates, whether rendering the lighting atmosphere from the abstract description is possible or not;

wherein the creating of the plurality of light element templates automatically translates and creates the plurality of templates for the possible light effects on the plurality of lighting units of the lighting infrastructure;

summarizing the possibilities of the lighting infrastructure for different areas in a lighting infrastructure information according to the type of light that the light units of the lighting infrastructure can generate, wherein each area comprises an area selector as an indication of a certain semantic location;

organizing and grouping the lighting infrastructure information by area selectors for generating a light element template, wherein an area selector is an indication of a certain semantic location and comprises one or more area types; and wherein the step of automatically processing the received light element templates by comparing them with the light elements of the abstract description comprises determining the area selector of a certain light element of the abstract description, locating a light element template with the same area selector than the certain light element, and if a light element template can be located checking further parameters of the certain light element by comparing them with the located light element template.

2. The method of claim 1, further comprising the step of automatically making information on available light units of the lighting infrastructure and their capabilities available in a network environment by device discovery mechanism.

3. The method of claim 1, further comprising the step of making available the semantic location that a light unit is in or generates its lighting effect in by an automatic installation or calibration procedure.

4. The method of claim 1, further comprising the steps of
selecting the lighting atmosphere by a client communicating with a server,
transmitting the light element templates of the lighting infrastructure from the client to the server,
automatically processing the received light element templates by comparing them with the light elements of the abstract description of the selected light atmosphere on the server,
transmitting the processing result from the server to the client, and
signaling whether rendering the lighting atmosphere from the selected abstract description is possible or not depending on the received processing result on the client.

5. The method of claim 1, further comprising the steps of
electronically receiving light element templates of several lighting infrastructures, and
combining the received light element templates for further processing.

6. The method of claim 1, wherein the light element templates are electronically received over a network connection with a lighting controller of the lighting infrastructure.

7. A method for automatically verifying the possibility of rendering a lighting atmosphere from an abstract description, comprising:
creating a plurality of light element templates for a lighting infrastructure by automatically translating the plurality of templates for available light effects on a plurality of lighting units of the lighting infrastructure, the lighting infrastructure including the plurality of light units in a lighting system implementation;
electronically receiving the light element templates each containing an indication of light effects at a specified semantic location;
processing the received light element templates by comparing them with light elements of the abstract description;
signaling, based on the automatic processing of the received light element templates, the availability of rendering the lighting atmosphere from the abstract description;
summarizing the type of light that the light units of the lighting infrastructure can generate for different areas in a lighting infrastructure information;
organizing and grouping the lighting infrastructure information by at least one area selector for generating a light element template, wherein an area selector is an indication of a certain semantic location and includes one or more area types;
wherein processing the received light element templates by comparing them with the light elements of the abstract description includes:
determining the area selector of a certain light element of the abstract description;
locating a light element template with the same area selector than the certain light element, and if a light element template can be located;
checking further parameters of the certain light element by comparing them with the located light element template.

* * * * *